(12) United States Patent
Callies et al.

(10) Patent No.: US 7,294,807 B2
(45) Date of Patent: Nov. 13, 2007

(54) METHOD AND DEVICE FOR DRILLING HOLES IN WORKPIECES BY MEANS OF LASER BEAMS

(75) Inventors: Gert Callies, Buehl (DE); Markus Willert, Koenigsbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/486,549

(22) PCT Filed: Jul. 9, 2002

(86) PCT No.: PCT/DE02/02504

§ 371 (c)(1),
(2), (4) Date: Jul. 27, 2004

(87) PCT Pub. No.: WO03/015978

PCT Pub. Date: Feb. 27, 2003

(65) Prior Publication Data

US 2004/0245226 A1  Dec. 9, 2004

(30) Foreign Application Priority Data

Aug. 8, 2001 (DE) ................................ 101 38 866

(51) Int. Cl.
*B23K 26/38* (2006.01)
*B23K 26/14* (2006.01)
(52) U.S. Cl. .............................. 219/121.71; 219/121.84
(58) Field of Classification Search ............. 219/121.7, 219/121.71, 121.84
See application file for complete search history.

(56) References Cited

U.S. PATENT DOCUMENTS 3,601,576 A 8/1971 Schlafli et al.
3,742,182 A * 6/1973 Saunders ............... 219/121.71
4,220,842 A 9/1980 Stürmer et al.
4,441,008 A * 4/1984 Chan ..................... 219/121.71
4,945,207 A * 7/1990 Arai ...................... 219/121.84
5,374,803 A * 12/1994 Yamada ................. 219/121.67

(Continued)

FOREIGN PATENT DOCUMENTS

DE     197 45 280     4/1999

(Continued)

OTHER PUBLICATIONS

Sun et al., "Inert Gas Beam Delivery for Ultrafast Laser Micromachining at Ambient Pressure", Journal of Applied Physics, American Institute of Physics, New York, vol. 89, No. 12, Jun. 15, 2001.*

(Continued)

*Primary Examiner*—Geoffrey S. Evans
(74) *Attorney, Agent, or Firm*—Kenyon & Kenyon LLP

(57) ABSTRACT

A method and a device for producing holes in workpieces by using at least one laser beam, in particular a short-pulse or ultrashort-pulse laser beam, whereby a process gas is supplied to the point of contact of the laser beam with the workpiece. At least one parameter of the process gas, i.e., its composition, pressure, volume flow, for example, is selected and the process gas is supplied to the interaction zone between the laser beam and the workpiece in such a way that the hole produced by the laser beam has a desired quality (hole geometry, reduced ablation residues, or none at all, etc.).

12 Claims, 3 Drawing Sheets

U.S. PATENT DOCUMENTS

| | | | |
|---|---|---|---|
| 5,607,606 A * | 3/1997 | Mori et al. | 219/121.67 |
| 5,763,855 A * | 6/1998 | Shioji | 219/121.84 |
| 6,204,475 B1 * | 3/2001 | Nakata et al. | 219/121.84 |
| 6,303,901 B1 * | 10/2001 | Perry et al. | 219/121.71 |
| 2002/0170891 A1 * | 11/2002 | Boyle et al. | 219/121.67 |

FOREIGN PATENT DOCUMENTS

| | | |
|---|---|---|
| EP | 0 352 326 | 1/1990 |
| EP | 0 635 331 | 1/1995 |
| EP | 0 985 484 | 3/2000 |
| JP | 64-57994 A * | 3/1989 |
| JP | 2001-18082 A * | 1/2001 |
| WO | WO 02/076666 | 10/2002 |

OTHER PUBLICATIONS

"Gase für Bearbeitungslaser", Laser Magazin Jun. 1995, pp. 5-7.

Sun, J. et al. "Inert Gas Beam Delivery For Ultrafast Laser Micromachining at Ambient Pressure", Journal of Applied Physics, American Institute of Physics, New York, vol. 89, No. 12, Jun. 15, 2001.

Hansmann, M. (u.a.): Flexibles Gasversorgungssystem für die Lasermaterialbearbeitung. IN: wt Werkstattstechnik, 1987, pp. 260-264.

Müller, R. (u.a.): Die Bedeutung der Gasführung beim Laserstrahlschneiden von kurzglasfaserverstärkten Verbundwerkstoffen.IN: Laser und Optoelektronikm 1990, H. 3, pp. 46-53.

\* cited by examiner

METHOD AND DEVICE FOR DRILLING HOLES IN WORKPIECES BY MEANS OF LASER BEAMS

FIELD OF THE INVENTION

The present invention relates to a method and a device for producing holes in workpieces by using at least one laser beam.

BACKGROUND INFORMATION

Conventional devices and methods are used for producing precise microholes in workpieces by using laser beams, where the holes may have a diameter smaller than 250 µm.

In laser beam drilling, in particular using short-pulse lasers with the conventional devices, melt burrs are formed in workpieces made of a metallic material on the laser beam entrance side of the workpiece which must be deburred in an afterworking operation. Furthermore, a melt film is formed in the hole, i.e., on the peripheral surface of the hole, which must also be removed subsequently, but there must not be any unwanted loss of material at the edges of the hole and/or blockage of the hole.

In the field of fuel injection, for example, there is a growing demand for conical holes, e.g., in nozzles, so that the laser beam entrance opening (fuel outlet) usually requires a smaller diameter than the laser beam exit opening (fuel inlet). Conventionally, to produce these holes having a desired conicity, the workpiece may be tilted in relation to the laser beam and/or the machining strategy, i.e., the parameters of the laser beam, may be adjusted accordingly. It has been found that the conicity which is achievable with the conventional methods and is definable on the basis of the k factor is relatively limited, depending on the diameter of the hole.

SUMMARY

A method according to an example embodiment of the present invention may have the advantage over the related art that it is possible to produce holes of the desired quality through controlled adjustment of at least one process gas parameter, in particular the composition, pressure, and/or volume flow of the process gas and a special process gas supply. It is not necessary here to change the laser beam parameters or to tilt the workpiece with respect to the laser beam. In conjunction with the present invention, at least the following criteria determine the "quality" of the hole: the shape of the hole and—in the case of workpieces made of at least one metallic material—the ablation residues. Ablation residues are understood in particular to refer to melt burrs ("piles of melt") on the workpiece surface on the laser beam entrance side and the melt film on the wall or walls of the hole. It has been found that melt burrs may be prevented completely by the method according to the present invention, and the resulting melt film has only a very small thickness. Ablation residues may thus be prevented or reduced at least to a harmless extent, so that afterworking of the hole may be reduced, i.e., simplified or possibly eliminated entirely. The example method according to the present invention also permits a controlled influence on the shape of the hole. Holes having a circular cross section that is constant or generally constant over the entire length of the hole as well as holes having a desired conicity may be implemented. The "conical" holes preferably have a circular cross section with the diameter varying over the length of the hole. Due to the fact that at least the hole shapes mentioned above are implementable by this method, ablation residues are prevented and/or significantly reduced, so inexpensive production of one or more holes is readily possible. Furthermore, it has been found that the machining times may be shortened in comparison with conventional methods.

The principle on which the example method according to the present invention is based is itself based on the fact that the process gas supplied to the interaction zone between the laser beam and the workpiece determines the properties of the material vapor-plasma mixture and thus the interaction between the laser beam and the workpiece. The atmosphere surrounding the hole is compressed due to material evaporating from the workpiece, so a strong shock wave may develop and may reach a rate of propagation of up to several times 10 km/s, e.g., when machining a workpiece by using a short-pulse laser. The shock wave forms a barrier for the material evaporating from the workpiece, with the pressure, the density, and the temperature and thus also the degree of ionization and the absorption capacity in the material vapor-plasma mixture being related to the properties of the shock wave. The rate of propagation of the shock wave and its thermodynamic properties are also a function of the atmosphere surrounding the hole. By the method according to the present invention, it is possible to create atmospheric conditions around the hole such that the advantages mentioned above may be achieved.

An example embodiment of the method that is particularly preferred is characterized in that preferably for each specific application, the composition, pressure, and/or volume flow of the process gas supplied to the interaction zone and/or the supply strategy (process gas management) are adjusted as a function of at least one characteristic feature of the hole, e.g., the hole diameter, the desired conicity, a defined rounding of at least one of the hole rims, i.e., edges and the like, and/or at least one characteristic feature of the workpiece, e.g., the wall thickness, the workpiece material, etc. The parameters of the process gas during the production of a hole need not necessarily be constant but instead may also be controlled—as provided in an advantageous variant—preferably over time. Thus, for example, "preboring" of the hole using a process gas composed of helium and a subsequent "afterboring/boring" using a process gas composed of argon are both possible.

In one example embodiment of the method, the laser beam is a short-pulse laser beam (ns pulses) having a pulse duration of preferably less than 100 ns or an ultrashort-pulse laser beam (fs/ps pulses). Other laser concepts may of course also be used to implement this method.

In one example embodiment, a hole having a desired conicity is produced, the conicity factor (k) of the hole being variable through appropriate process gas management and adjustment of the process gas parameters. It has been found that holes having a conicity factor k of −3 to +3 are easily produced. However, the method according to the present invention also makes it possible to achieve conicity factors greater than +3. Conicity factor k is defined as follows:

$$(\o_A - \o_E)/10$$

where $\o_A$ is the diameter of the laser exit opening and $\o_E$ is the diameter of the laser entrance opening, and the dimensions of the diameter are given in µm (micrometers).

By the example method according to the present invention, practically any desired conicity may be achieved for holes having a diameter of less than 250 µm and for wall thicknesses of the workpiece of approximately 0.2 mm to 2 mm, where conicity factor k may be in a range from −3 to +3, for example.

The at least one process gas used during the production contains at least one gas, for example, helium (He), oxygen ($O_2$), argon (Ar), or nitrogen ($N_2$). However, the process gas may also contain multiple gases, in particular those mentioned above, which are mixed together preferably before being supplied to the interaction zone, i.e., before reaching the interaction zone. If the process gas is combined from multiple gases, the amount of each gas in the process gas may be between 0% and 100%, with the sum of the proportions of all gases of the process gas amounting to 100%. Since different gases have different physical properties, the process gas is composed of different gases in a certain mixing ratio, so that a desired atmosphere may be achieved around the hole to be drilled by using the laser beam, resulting in a desired hole shape, e.g., conicity of the hole, and preferably minimizing or eliminating melt burrs and the melt layer on the walls of the hole in laser machining of metallic materials.

It has proven advantageous if the volume flow supplied to the interaction zone is in a range from approximately 0.8 Nl/min to 270 Nl/min and if the pressure of the process gas is in a range from 0.1 bar to 20 bar, preferably from 0.3 bar to 15 bar, in particular from 0.5 bar to 10 bar.

One example device according to the present invention includes a laser beam source for generating at least one laser beam directable at the workpiece and a nozzle configuration having at least one nozzle which may receive at least one pressurized process gas, the gas stream emitted from the nozzle being directable in the direction of the point of contact of the laser beam with the workpiece and/or into the interaction zone between the laser beam and the workpiece. This device is characterized by an apparatus for adjusting the composition, pressure, and/or amount of process gas supplied to the point of contact. By using a process gas suitable for the particular application and/or the targeted adjustment of the process gas pressure and/or volume flow, it is possible to vary and/or adjust the conicity of holes in a controlled manner without having to adjust the parameters of the laser beam. Furthermore, in the case of metallic workpieces, melt burrs and/or melt films on the wall of the hole may be minimized, preferably eliminated entirely.

According to one refinement of the present invention, the example device has at least one mixing apparatus for mixing the process gas and at least one supply line in fluid connection to the nozzle for supplying the mixed process gas. The process gas is thus combined before reaching the interaction zone between the laser beam and the workpiece. The mixing apparatus preferably has a controller for adjusting the process gas parameters (composition, pressure, volume flow).

BRIEF DESCRIPTION OF THE DRAWINGS

The present invention is explained in greater detail below in several exemplary embodiments with reference to the drawings.

DESCRIPTION OF EXAMPLE EMBODIMENTS

Figure 1:
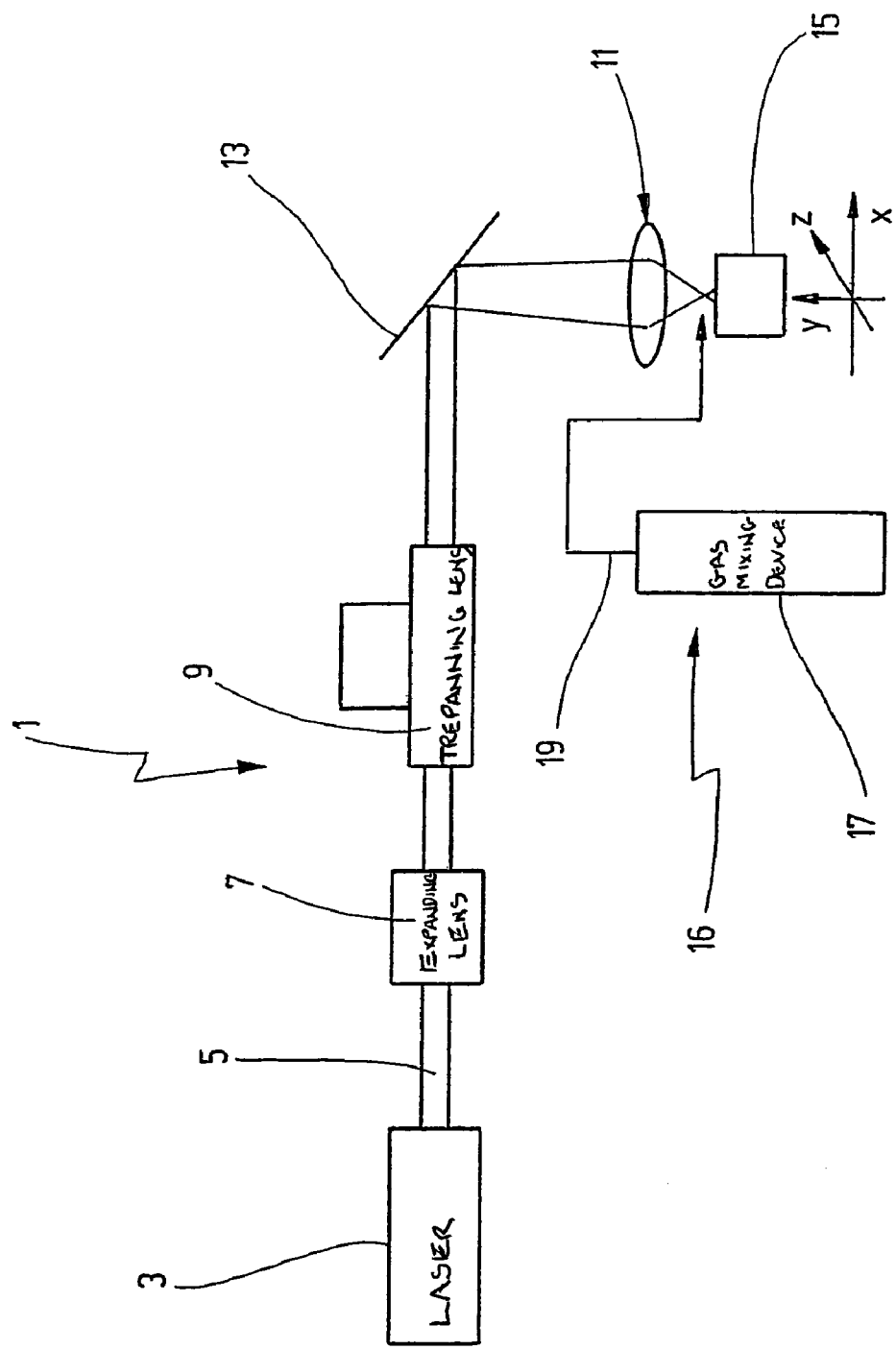
FIG. 1 shows a basic diagram of the design of an exemplary embodiment of the device according to the present invention.

FIG. 1 shows a schematic diagram of the design of an exemplary embodiment of a device 1 for creating holes in workpieces. Device 1 includes a laser beam source 3 by which short-pulse laser beams or ultrashort-pulse laser beams may be generated, these beams being referred to below simply as laser beams 5. An expanding lens 7, a trepanning lens 9 and a focusing lens 11 are situated in the path of the beam of the laser. In the area between trepanning lens 9 and focusing lens 11, laser beam 5 is deflected by 90°, for example, by a deflecting reflector 13. In another exemplary embodiment (not shown in the figures) of device 1, no expanding lens 7 is situated in the path of the beam.

FIG. 1 shows a workpiece 15 onto which laser beam 5 is directed to drill a hole, in particular a through-hole, having precision conicity. Workpiece 15 is situated downstream from the focusing lens, as seen in the direction of the path of laser beam 5. A control device (not shown) is provided for positioning workpiece 15 so that the position of workpiece 15 where the hole is to be drilled is situated exactly in the path of laser beam 5, workpiece 15 being adjustable by this device in directions x, y and z, as indicated by arrows.

Device 1 also has an apparatus 16 for adjusting the composition of the process gas, this apparatus including a mixing device 17 having a controller for mixing the process gas. The process gas preferably contains at least one of the following gases or a mixture thereof: helium, oxygen, argon, and nitrogen. These gases and, if necessary, other suitable gases are mixed together in a certain preselectable ratio in mixing apparatus 17. If the process gas is a mixed gas, the amount of each gas in the process gas may be between 0% and 100%. The process gas volume flow supplied to the interaction zone between laser beam 5 and workpiece 15 is preferably in a range from approximately 0.8 Nl/min to 270 Nl/min (standard liters per minute). The process gas pressure is preferably between 0.1 bar and 20 bar, in particular between 0.5 bar and 10 bar.

The process gas is supplied through a supply line 19 to a nozzle configuration (not shown in FIG. 1) which includes at least one nozzle. With the help of apparatus 16, the pressure and/or the quantity of process gas supplied to the interaction zone between laser beam 5 and workpiece 15 may be adjusted. Control of process gas parameters over time is easily implementable. For example, preboring of the hole using helium and then finish-boring with argon are possible.

Figure 2:
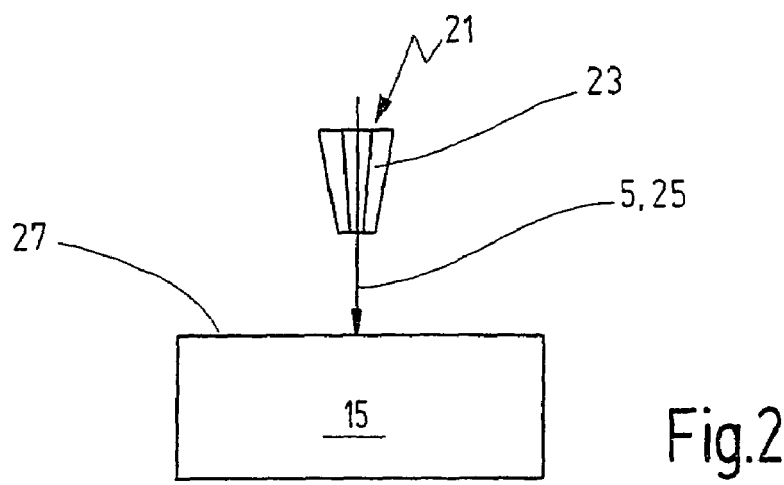
FIGS. 2-4 each show an exemplary embodiment of a nozzle configuration for supply process gas.

FIG. 2 shows a schematic diagram of a detail of a first exemplary embodiment of nozzle configuration 21, which includes a nozzle 23 to which pressurized process gas may be supplied. Nozzle 23 has a conical shape in the longitudinal section, its cross section through which process gas flows becoming smaller in the direction of workpiece 15. The configuration of nozzle 23 here is selected so that process gas stream 25 emitted from nozzle 23 runs coaxially with laser beam 5. Process gas stream 25 and laser beam 5 are aligned here perpendicular to a top side 27 of the workpiece.

Figure 3:
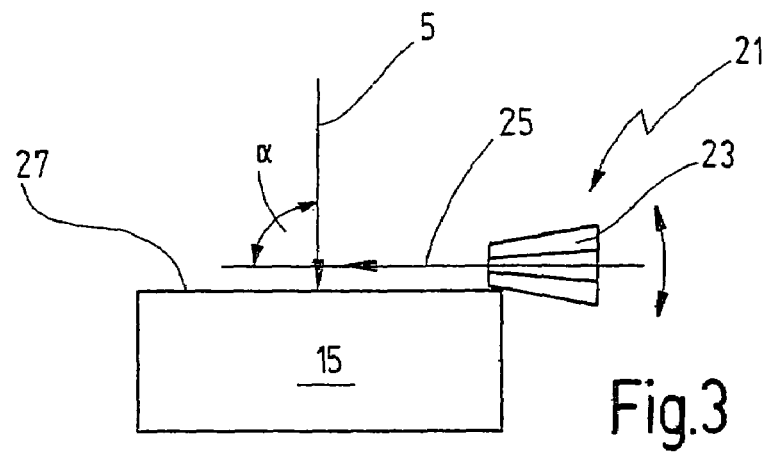

FIG. 3 shows a second exemplary embodiment of nozzle configuration 21 which differs from nozzle configuration 21 described with reference to FIG. 2 only in that nozzle 23 is aligned in relation to laser beam 5 so that process gas stream 25 emitted from nozzle 23 is supplied to laser beam 5 and/or the interaction zone at an angle α of approximately 90°. Process gas stream 25 here runs parallel to planar workpiece top side 27. Nozzle 23 is preferably designed to be adjustable, so that the setting of angle α at which process gas stream 25 runs in relation to laser beam 5 is adjustable, namely between 0° and 90°.

Figure 4:
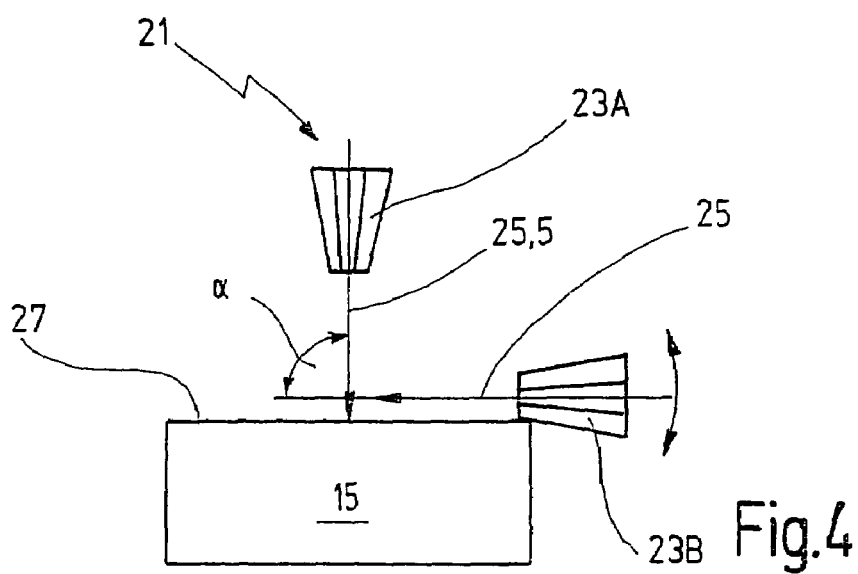

FIG. 4 shows a third exemplary embodiment of nozzle configuration 21 having nozzles 23A and 23B, where nozzle 23A corresponds in configuration and design to nozzle 23, which was described with reference to FIG. 2, and nozzle 23B corresponds to nozzle 23, which was described with reference to FIG. 3. As indicated with a double arrow, nozzle 23B is adjustable in relation to nozzles 23A, so that angle α at which process gas streams 25, i.e., process gas 25 blown out of nozzles 23B, and laser beam 5 strike one another is variable between 0° and 90°. Nozzles 23A, 23B may receive the same process gas or different process gases. The parameters of the process gas streams emitted from nozzles 23A, 23B are preferably independently adjustable, thus permitting optimum adjustment of the atmosphere around the hole created in workpiece 15 by laser beam 5.

As an alternative to nozzles having a conical cross section as described with reference to the figures, for example, Laval nozzles, ring nozzles, free forms, or similar types may also be used, i.e., the nozzle geometry described above is only one of many possible nozzle geometries.

With device 1, which is described with reference to FIGS. 1 through 4, the method according to the present invention may be readily implemented. It provides for the composition, the pressure, and/or volume flow of process gas to be selected and for the process gas to be supplied to the interaction zone between the laser beam and the workpiece in such a way that the hole produced by the laser beam has a desired quality, in particular conicity and/or little or no melt burrs or melt films without workpiece 15 wobbling and/or without having to alter the parameters of laser beam 5. The device parts mentioned above are preferably situated in a stationary position with respect to workpiece 15, at least during the production of the bore. This is understood not to include the optical wedge plates of trepanning lens 9 indicated in FIG. 1, which are in rotation during the operation of device 1.

Figure 5:
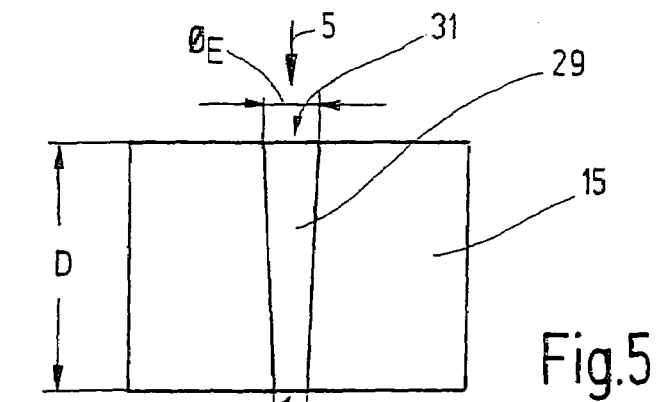
FIGS. 5 and 6 each show a cross section through a hole produced by using a laser beam and using various process gases.

FIG. 5 shows a longitudinal section through a conical hole 29 produced by device 1, its largest diameter being approximately 100 μm. Thickness D of workpiece 15 is relatively small and may easily be in a range between 0.2 mm and 2.0 mm. The process gas supplied to the interaction zone between laser beam 5 and workpiece 15 during the production of hole 29 consists of 80% argon and 20% helium. Hole 29 has a diameter $\o_E$ at laser beam entrance opening 31 which is greater than diameter $\o_A$ at laser beam exit opening 33. Conicity factor k (($\o_A-\o_E$)/10) here amounts to approximately −2. Hole 29 has practically no melt burrs and the melt film (not shown) on the wall of the hole/bore has a minimal thickness. The edges of the hole at the point of laser entrance and exit have relatively sharp edges. Rounded hole edges may also be implemented through an appropriate change in the process gas parameters and/or the composition of the process gas.

Figure 6:
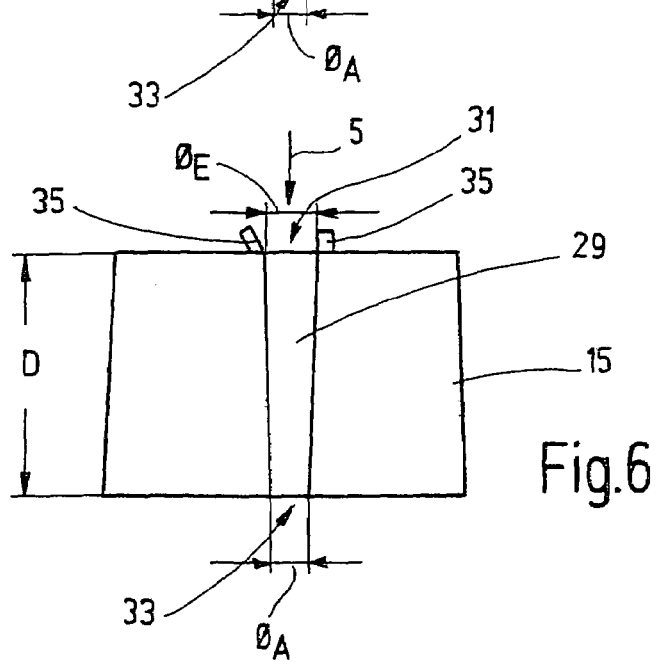

FIG. 6 shows a longitudinal section through a conical hole 29, in the production of which the process gas supplied to the interaction zone between laser beam 5 and workpiece 15 consists of 20% argon and 80% helium. The other process gas parameters (pressure, volume flow) and the laser beam parameters are the same as those in the production of hole 29 shown in FIG. 5. It is readily apparent that hole 29 has a much larger conicity factor k, amounting here to approximately −1. This means that the conicity of hole 29 is different only due to the change in the composition of the process gas, i.e., the size of the amount by volume of the gases added to the process gas. The conicity of the hole may thus be varied in a controlled manner determined exclusively by the composition of the process gas. In addition, a controlled supply of the process gas to the interaction zone is necessary, as described with reference to FIGS. 1 through 4, for example. To permit an even more precise setting of the conicity of the hole, in this variant the pressure and the process gas volume flow supplied to the interaction zone between laser beam 5 and workpiece 15 may also be varied accordingly.

The hole shown in FIG. 6 has melt burrs 35 on workpiece top side 27, in contrast with hole 29 shown in FIG. 5, while the edge of the hole at laser beam exit opening 33 has sharp edges. Through appropriate adjustment of the process gas parameters and controlled process gas supply to the interaction zone, the characteristic features of the hole (conicity, diameter, sharp edges or rounded, etc.) may also be controlled accurately.

In the holes having a diameter smaller than 250 μm and a wall thickness D of workpiece 15 less than or equal to 2 mm, any desired conicity factor (k) in the range between −3 and +3 or even larger may easily be implemented by selecting a corresponding process gas composition and by controlled supply of the process gas to the interaction zone. Other parameters for adjusting a precise conicity of the hole include the pressure and volume flow of the process gas.

In an advantageous exemplary embodiment of the device according to the present invention, an optical apparatus, in particular having a special trepanning lens, is used to influence the laser beam by which alone it is possible to produce conical holes having a certain conicity factor, preferably adjustable, without having to vary, i.e., adjust, the process gas parameters and management in a special way. For example, a conical hole having a conicity factor of 5 is producible with a certain setting of the lens. By the method according to the present invention which provides for targeted influencing of at least one process gas parameter and a special supply of process gas to the interaction zone, it is now possible in an advantageous manner to increase and decrease this conicity factor of 5, preferably with a high precision, e.g., to 5.4 or 3.7 or 7.8. In other words, a precision adjustment of the conicity of the hole which is implemented, i.e., determined, by the laser beam parameters is possible without having to alter the laser beam parameters.

Figure 7:
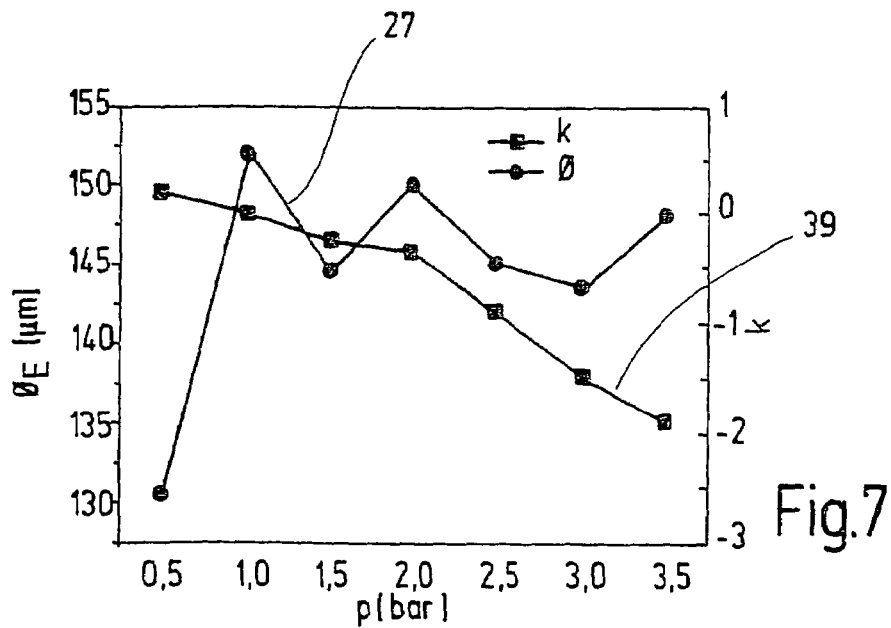
FIG. 7 shows a diagram in which the diameter of the hole on the laser beam entrance side and the conicity factor k are plotted as a function of the process gas pressure.

FIG. 7 shows a diagram in which hole diameter $\o_E$ in μm (micrometers) on the laser beam entrance side is plotted on the left ordinate, conicity factor k of hole 29 is plotted on the right ordinate and pressure p of the process gas in bar, where the process gas is composed of 50% helium and 50% oxygen, is plotted on the abscissa. Several measured hole diameters $\o_E$ and a particular conicity factor k are plotted in the diagram as a function of the process gas pressure. The holes were all produced under the same conditions, i.e., the laser beam parameters and the composition of the process gas were the same; likewise, the manner in which the gas was supplied to the interaction zone was also the same. Only the pressure of the process gas was varied. The values thus determined are shown in the following table:

| Process gas p [bar] | Hole diameter ø [μm] | Conicity factor k |
| --- | --- | --- |
| 0.5 | approximately 131 | approximately 0.25 |
| 1.0 | approximately 152 | approximately 0.00 |
| 1.5 | approximately 144 | approximately 0.25 |
| 2.0 | approximately 150 | approximately 0.30 |
| 2.5 | approximately 145 | approximately 0.90 |
| 3.0 | approximately 143 | approximately 1.50 |
| 3.5 | approximately 148 | approximately 1.90 |

These table values show that it is possible to produce very different hole conicities and hole diameters only by varying the process gas pressure, i.e., with the same composition of the process gas.

With the example method according to the present invention, the cross-sectional shape of the bores/holes (e.g., conical or having a constant cross section over the entire length) is adjustable in a controlled manner. Melt burrs on the laser beam entrance side of the workpiece and melt films on the hole walls may be reduced to a low extent, hole edge shapes are adjustable, and remachining operations may be greatly simplified or in the ideal case eliminated entirely. The criteria mentioned above in particular determine the quality of the hole, which is particularly high in holes produced by the device and/or method according to the present invention in comparison with holes produced by known devices/methods. This example method may be particularly suitable for producing precision microholes having a diameter of less than 250 μm, such as those provided in the nozzles of fuel injector systems, for example. With the device according to the present invention and the method implementable with it, conical holes having a larger diameter are also producible with precision.

What is claimed is:

1. A method for producing holes in a workpiece, comprising:
   directing at least one laser beam at a workpiece, wherein the at least one laser beam includes a short-pulse laser beam or an ultrashort pulse laser beam;
   producing a hole having a desired conicity, a conicity factor of the hole being variable by optically influencing the laser beam; and
   supplying at least one process gas to an interactive zone between the laser beam and the workpiece, the process gas containing at least one of helium, oxygen, argon, nitrogen and a mixture thereof;
   wherein for a desired precision adjustment for increasing or reducing the conicity of the hole, the process gas is supplied to the interaction zone with a pressure in a range from 0.1 bar to 20 bar and a process gas volume flow in a range from approximately 0.8 Nl/min to 270 Nl/min.

2. The method as recited in claim 1, further comprising:
   controlling at least one parameter of the process gas during production of the hole.

3. The method as recited in claim 2, wherein the controlling step includes controlling the at least one parameter of the process gas overtime.

4. The method as recited in claim 1, wherein the hole has a diameter of less than 250 μm.

5. The method as recited in claim 4, wherein the diameter of the hole is less than 120 μm.

6. The method as recited in claim 1, wherein the process gas contains four different gases.

7. The method as recited in claim 1, wherein the process gas is composed of multiple gases, and wherein the method further comprises:
   mixing the gases together before reaching the interaction zone.

8. The method as recited in claim 1, wherein the pressure is in a range from 0.3 bar to 15 bar.

9. The method as recited in claim 8, wherein the pressure is in a range from 0.5 bar to 10 bar.

10. The method as recited in claim 1, wherein the process gas is supplied in a stream which runs coaxially with the laser beam.

11. The method as recited in claim 1, wherein the process gas is supplied in a plurality of gas streams, a first one of the gas stream, being run coaxially with the laser beam, and a second one of the gas streams being directed at an angle to the laser beam, the angle being in a range from 0° to 90°.

12. The method as recited in claim 1, wherein the process gas is supplied in a stream which runs from 0° to 90° relative to the laser beam.

* * * * *